US011365852B2

(12) United States Patent
Eddins (10) Patent No.: US 11,365,852 B2
(45) Date of Patent: Jun. 21, 2022

(54) AGRICULTURAL LIGHTING FOR PLANTS (71) Applicant: Grow Light Design, LLC, Soutlake, TX (US)

(72) Inventor: Scott Eddins, Southlake, TX (US)

(73) Assignee: Grow Light Design, LLC, Southlake, TX (US)

( * ) Notice: Subject to any disclaimer, the term of this patent is extended or adjusted under 35 U.S.C. 154(b) by 0 days.

(21) Appl. No.: 17/278,297

(22) PCT Filed: Oct. 5, 2019

(86) PCT No.: PCT/US2019/054902
§ 371 (c)(1),
(2) Date: Mar. 20, 2021

(87) PCT Pub. No.: WO2020/061595
PCT Pub. Date: Mar. 26, 2020

(65) Prior Publication Data
US 2021/0356085 A1    Nov. 18, 2021

(51) Int. Cl.
*F21S 4/24* (2016.01)
*A01G 9/24* (2006.01)
(Continued)

(52) U.S. Cl.
CPC .............. *F21S 4/24* (2016.01); *A01G 7/045* (2013.01); *A01G 9/249* (2019.05); *F21S 8/061* (2013.01);
(Continued)

(58) Field of Classification Search
CPC ....... F21S 4/20; F21S 4/24; F21S 4/28; F21Y 2107/30; A01G 9/249; A01G 7/045;
(Continued)

(56) References Cited

U.S. PATENT DOCUMENTS 6,183,104 B1    2/2001  Ferrara
7,202,613 B2    4/2007  Morgan
(Continued)

FOREIGN PATENT DOCUMENTS

CN          2859190 Y    9/2005
CN        201265761 Y    8/2008
(Continued)

OTHER PUBLICATIONS

Linear LED Lighting, Creative Systems Lighting, May 1, 2013, 16 pages.
(Continued)

*Primary Examiner* — Alexander K Garlen
(74) *Attorney, Agent, or Firm* — Peter V. Schroeder; Booth Albanesi Schroeder PLLC (57) ABSTRACT

A grow lighting system for use with plants includes an elongated body for positioning adjacent a plant. The elongated body defines multiple lighting channels extending the length of the body. Linear grow lighting sources, such as grow lighting LED strips, are removably positioned in a corresponding lighting channel. Each linear lighting source is oriented to emit light radially outward from the body. The fixture body can be suspended generally vertically.

20 Claims, 8 Drawing Sheets

(51) Int. Cl.
*A01G 7/04* (2006.01)
*F21S 8/06* (2006.01)
*F21V 19/00* (2006.01)
*F21V 23/00* (2015.01)
*F21Y 115/10* (2016.01)

(52) U.S. Cl.
CPC ............ *F21S 8/068* (2013.01); *F21V 19/003* (2013.01); *F21V 19/0015* (2013.01); *F21V 23/001* (2013.01); *F21Y 2115/10* (2016.08)

(58) Field of Classification Search
CPC .. F21V 21/008; F21V 21/088; F21V 21/0885; F21V 19/001; F21V 19/0045
See application file for complete search history.

(56) References Cited

U.S. PATENT DOCUMENTS

| | | | |
|---|---|---|---|
| 7,857,482 B2 | 12/2010 | Reo | |
| 9,033,542 B2 | 5/2015 | Peck | |
| 9,206,966 B2 | 12/2015 | Morgan et al. | |
| 9,989,206 B2 | 6/2018 | Eddins | |
| 10,006,615 B2 | 6/2018 | Horst | |
| 10,132,488 B1 * | 11/2018 | Waldon | A01G 9/249 |
| 10,941,927 B1 * | 3/2021 | Yang | F21V 21/38 |
| 2007/0171631 A1 | 7/2007 | Davis | |
| 2009/0109708 A1 | 4/2009 | Horwitz | |
| 2010/0135020 A1 | 6/2010 | Moore | |
| 2010/0148673 A1 | 6/2010 | Stewart | |
| 2011/0089838 A1 | 4/2011 | Pickard et al. | |
| 2011/0192082 A1 | 8/2011 | Uchiyama | |
| 2011/0248631 A1 * | 10/2011 | Chuang | F21V 19/0045 315/32 |
| 2013/0094225 A1 | 4/2013 | Leichner | |
| 2014/0168969 A1 | 6/2014 | Heggemann et al. | |
| 2017/0367273 A1 * | 12/2017 | Bylsma | G02B 6/001 |

FOREIGN PATENT DOCUMENTS

| | | |
|---|---|---|
| CN | 201547581 U | 9/2009 |
| CN | 202056668 U | 3/2011 |
| CN | 202834814 U | 5/2012 |
| CN | 203363827 U | 3/2013 |
| CN | 205191407 | 4/2016 |
| CN | 206929621 | 1/2018 |
| CN | 108758376 A * | 11/2018 |
| CN | 110671645 A * | 1/2020 |
| CN | 110701514 A * | 1/2020 |
| KR | 20090004575 | 5/2009 |
| KR | 101243167 B1 | 3/2013 |
| WO | 2012161403 A1 | 11/2012 |
| WO | 2020050846 A1 | 3/2020 |

OTHER PUBLICATIONS

PCT/US2019/054902, International Search Report and Written Opinion, dated Feb. 5, 2020, 9 pages.

* cited by examiner

AGRICULTURAL LIGHTING FOR PLANTS

TECHNICAL FIELD

The present disclosure relates to indoor, greenhouse, agricultural and horticultural plant growing, and more specifically, to such lighting for vine-like plants.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF PREFERRED EMBODIMENTS

The present disclosures are described by reference to drawings showing one or more examples of how the disclosures can be made and used. In these drawings, reference characters are used throughout the several views to indicate like or corresponding parts. In the description which follows, like or corresponding parts are marked throughout the specification and drawings with the same reference numerals, respectively. The drawings are not to scale and proportions of certain parts have been exaggerated to better illustrate details and features. Directional terms, such as "up," "down," "upward," "downward," and the like, are made with reference to the accompanying figures unless otherwise indicated and are not to be taken as limiting the embodiments in their orientations of use.

Indoor, greenhouse agricultural growing of *Humulus lupulus* has become more common, but presents unique challenges. *Humulus lupulus* produces hops, or hops flowers, widely used in manufacture of food items. The indoor grow of hops allows for growing of hops flowers outside a very specific temperate climate where currently all hops are grown. *Humulus lupulus* plants present unique infrastructure requirements for an indoor environment where plants must be close in proximity in order to grow enough yield of hops flowers to achieve an economic yield. Hops plants are full grown at around twenty feet tall and are vine-like spreading plants. The close proximity required for economic yields produces challenges in providing each plant with enough light to allow the plants to reach their mature height. The upper reaches of the larger plants reduce or eliminate sufficient light from reaching the lower parts of the vines and negatively effects plant growth. This is the case whether the greenhouse utilizes natural light from overhead windows or overhead lighting.

A customizable lighting system is presented for use in the growth of *Humulus lupulus* plants, and other plants with similar growth patterns or presenting similar problems with sufficient lighting at lower levels, in a controlled greenhouse environment. Supplementary lighting, in the form of vertically installed lighting, provides light coverage along the height of the plant, including particularly at lower levels. The orientation of the lighting fixtures can be easily adjusted, varied or removed to accommodate changing requirements as the plants grow.

The present disclosure utilizes a non-metallic extruded channel design to hold multiple, independent, linear lighting sources. The lighting sources, when installed in the device, provide light over a long enough to extent to provide light over the height of the plants. Further, the lighting sources attached to the fixture provide light emission across 360 degrees around the fixtures, allowing for light provision to plants positioned at any point around the fixture.

Figure 1:
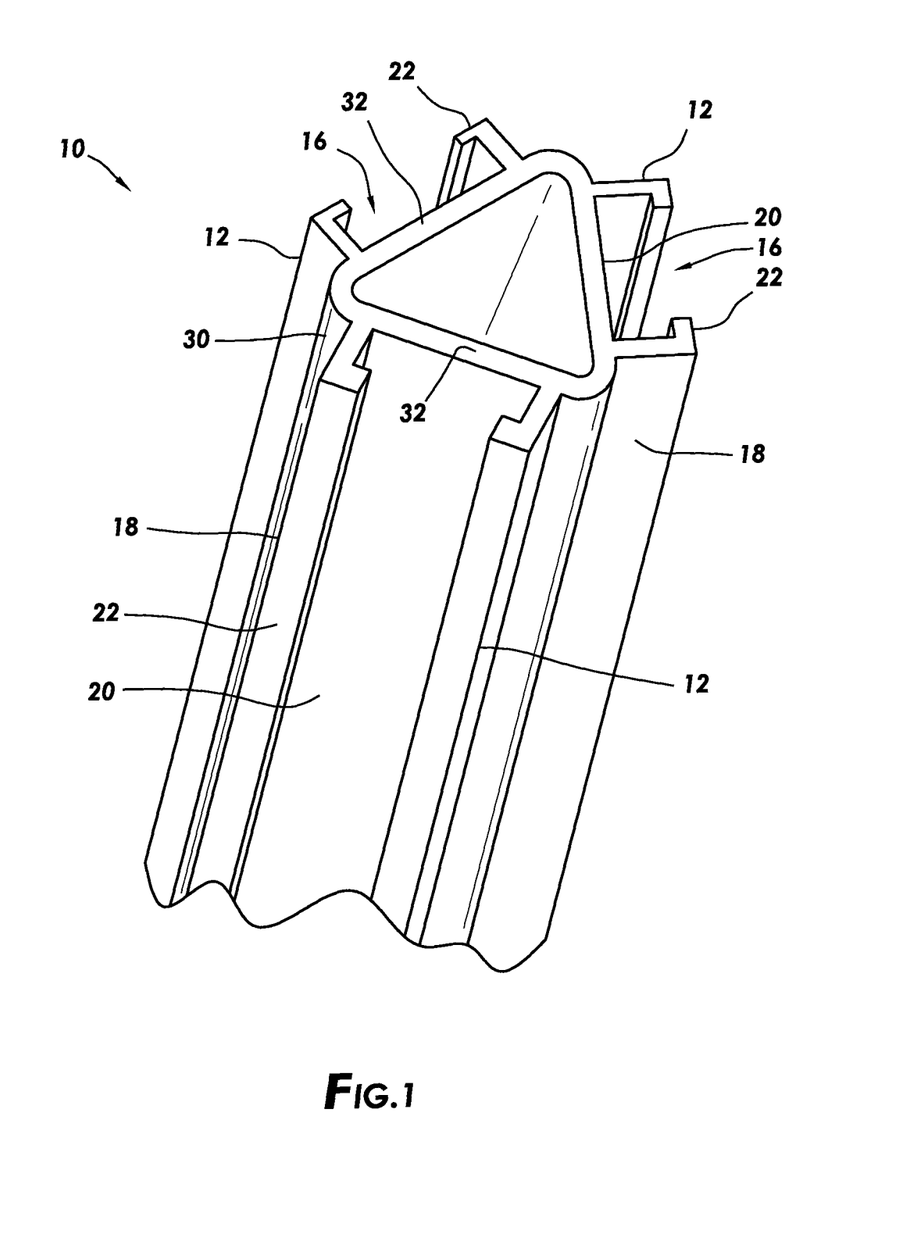
FIG. 1 is an orthogonal view of a linear lighting fixture according to aspects of the disclosure.

FIG. 1 is an orthogonal view of an exemplary embodiment of a lighting system according to aspects of the disclosure. A longitudinal lighting fixture 10 is presented having a plurality of mounting channels 12 for lighting sources 14. The lighting fixture 10 is designed for generally vertical alignment along and proximate to plants having a vertical growth pattern and for which economic yield is dependent in part on sufficient production by the vertically oriented plant's lower levels. For example, the hops plant grows up to twenty feet vertically and economic yield is increased where the lower levels of the plant continue to produce, requiring sufficient light at the lower levels.

Figure 2:
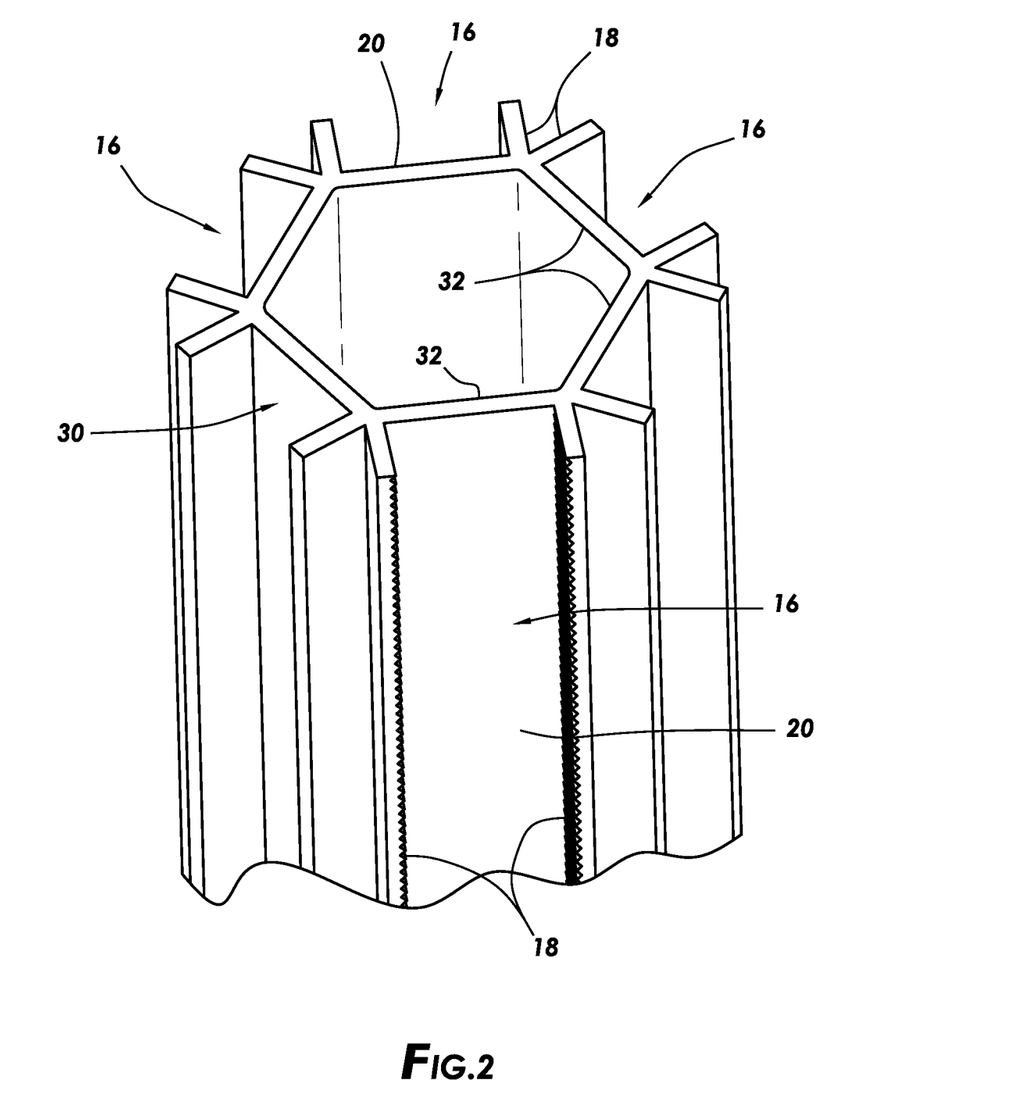
FIG. 2 is a perspective view of the orientation of the lighting fixture and the light source of the present invention.

The lighting fixture 10 is an extruded, linear, non-metallic product and does not require heat dissipation. The fixture 10 defines a longitudinally extending body 30. The body 30 can take various forms. For example, in FIG. 1 the body 30 comprises a generally tubular structure defined by three side walls 32 extending the length of the fixture and forming a triangular cross-section. In FIG. 2, for example, the body 30 comprises six side walls 32 creating a hexagon cross-section. Other arrangements are possible. The structure of the body 30 allows for spacing and orientation of the plurality of lighting channels to provide for radial emission of light across a wide range.

The fixture 10 includes a plurality of vertical lighting channels 12 designed to hold a plurality of linear lighting sources 14. The channels 12 define an interior passageway 16 for housing the lighting sources. The channel 12 can comprise, for example, longitudinal side walls 18, a back wall 20, and, optionally, flanges 22. In some embodiments, part or all of the back wall 20 of a channel 12 also serves as a side wall 32 of the body 30, as seen in FIGS. 1 and 2.

The channel 12 is sized to accept and hold a longitudinally extending lighting source. The channels 12 are designed to allow the lighting sources to be slid into, pressed into, or snapped into a fixed position in the channel interior passageway 16. In some embodiments, the light sources are friction fit into the channels. In other embodiments, the light sources are maintained in position in the channels by flanges 22, which can take the form of longitudinal flanges running substantially the length of the fixture or can be a plurality of shorter flange tabs spaced apart along the channel. Alternately, other attachment mechanisms can be used to attach and maintain the lighting sources in the channel. For example, strip lighting is available having adhesive backing, allowing the lighting sources to be adhered to the channel back wall.

The channels 12 are oriented to position the lighting sources 14 such that the lights 24 along the lighting source 14 emit light radially outwardly from the fixture. A plurality of lighting channels are oriented to position the lighting strips to emit light across a wide radial range about the fixture. For example, in FIG. 1, three lighting channels 12 are oriented at 120 degree intervals about the fixture. In FIG. 2, the six lighting channels are oriented at 60 degree intervals about the fixture. Other arrangements are possible and will be apparent to those of skill in the art.

The lighting fixtures 10 and lighting channels 12 are sufficiently long to provide lighting along substantially the entire length of the plant, thereby providing light to encourage plant growth along the entire height of the plants. In an embodiment, the fixtures are 16 feet long; in other embodiments, the fixtures are 20 feet long. Extrusion manufacturing allows for ease of creating lengthy fixtures and fixtures of any selected length. The elongated fixture 10 can be formed of multiple pieces joined together, such as by snap-fit, friction fit, adhesive, etc., allowing for ease of packaging, transport and assembly.

Figure 3:
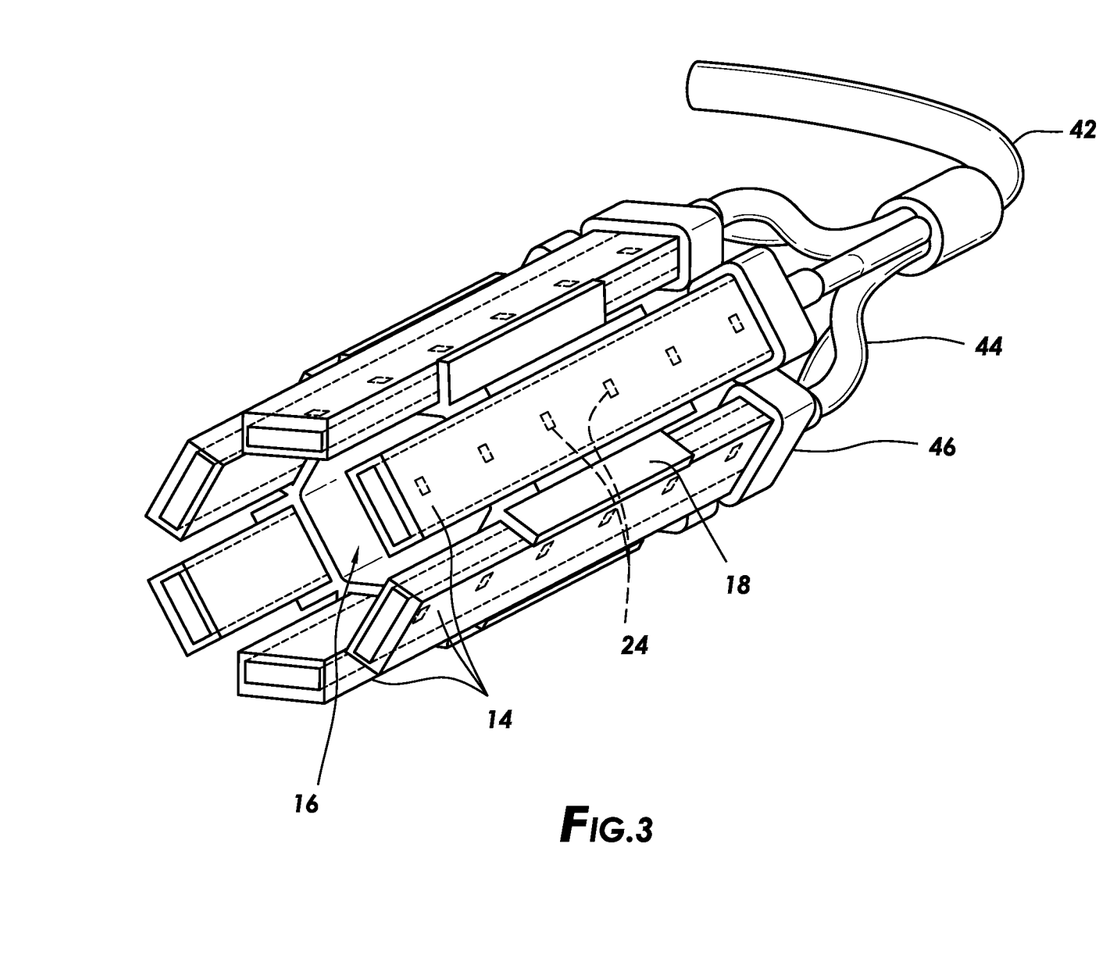
FIG. 3 is an orthogonal view of a non-metallic lighting fixture having a plurality of lighting channels each having a lighting source inserted into the channel with lights oriented to emit light radially away from the fixture.

FIG. 3 is an orthogonal view of a non-metallic lighting fixture 10 having a plurality of lighting channels 12 each having a lighting source 14 inserted into the channel with lights 24 oriented to emit light radially away from the fixture. Also seen is a portion of a cable and power management system 40 including a single fixture power cable 42 which splits into multiple, lighting source power cables 44 each of which attach to a lighting source 14 at a connector 46. Such an arrangement reduces the number of cables from the power source to the multitude of linear lighting sources expected to be used in an indoor grow facility.

Figure 4:
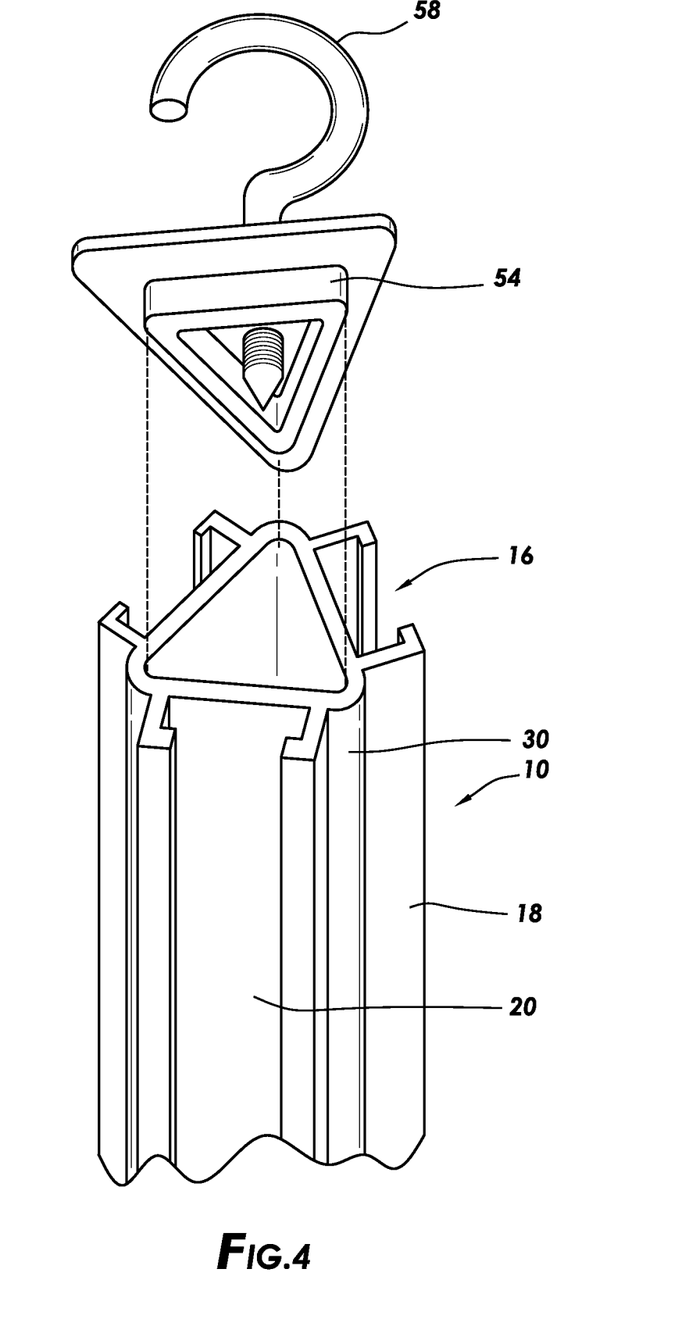
FIG. 4 is an orthogonal view of an exemplary mounting assembly for use as part of the lighting assembly according to aspects of the disclosure.

FIG. 4 is an orthogonal view of an exemplary mounting assembly 50 for use as part of the lighting assembly according to aspects of the disclosure. An end cap 52 is provided for attachment to the lighting fixture 10. The end cap 52 includes an attachment mechanism 54 which cooperates with a corresponding mechanism on the lighting fixture. In an embodiment, as shown, the attachment mechanism 54 is simply a plurality of walls which cooperate with the corresponding side walls 32 of the fixture. The end cap can be fixedly or removably attached to the lighting fixture. The end cap can affix to the fixture by friction fit, fasteners, adhesive, etc., such as is known in the art. As the end cap will support the weight of the fixture and lighting strips, the attachment must be secure enough to prevent the fixture from sliding out of the end cap. The end cap 54 also includes an attachment mechanism 56 for attaching a hook 58 or other means, such as a clamp, clip, hanger, ring, etc., or other attachment mechanism known in the art, for hanging the fixture from a support positioned above the fixture. For example, a support can be a wire, cable, rope, etc. (referred to collectively as a wire herein), strung horizontally above the plants and to which the fixtures are hung. The lightweight extruded material of the fixture make it relatively easy to hang and remove the fixtures from light supports.

The lighting source 14 can include a plurality of individual lights 24, such as LED lights along a longitudinal LED lighting strip or module. The lighting source 14 can take various forms. LED lighting strips, with or without adhesive backing, can be used. For example, the lighting source can be lighting strips or lighting modules such as are commercially available. Lighting modules have spaced apart, stiff circuit boards, each board typically having one to three light sources, the boards connected by intervening wires. Further, the lighting source can be a single color or color-changing sources which allow for color-changing as well as white. The LED lighting strips preferably have lights specifically designed to provide light for plants and to promote plant growth. For example, LED lights can provide red, blue, white, UV, etc., light at various stages of plant growth, such as at seeding, for vegetative growth, blooming, and overall health of the plant. Since the plants' light needs may change over the plants' life, a color changing LED strip can be used and the emitted light changed over the plant's life. Various spectrum lighting can be supplied, such as one or a mixture of the following: red 630-660 nm, blue at around 460 nm, white 6000-6500 k, UV 380-400 nm, IR 730-740 nm, etc. Lighting strips can be used having various lengths. For example, for a 20 foot fixture length, a 20 foot LED strip can be used. Alternately, shorter lengths can be used and connected end-to-end at strip connectors. Further, LED strip lighting is available for use with a controller which can operate the LED lights on the strip individually. Hence, it is possible to control the lights such that only lights adjacent the plants are on (e.g., the lower lights while the plant is short) to reduce electricity costs. Further, it would be possible to tune each light to a selected frequency (e.g., UV, white, red, etc.) based on the needs of the plant.

Figure 5:
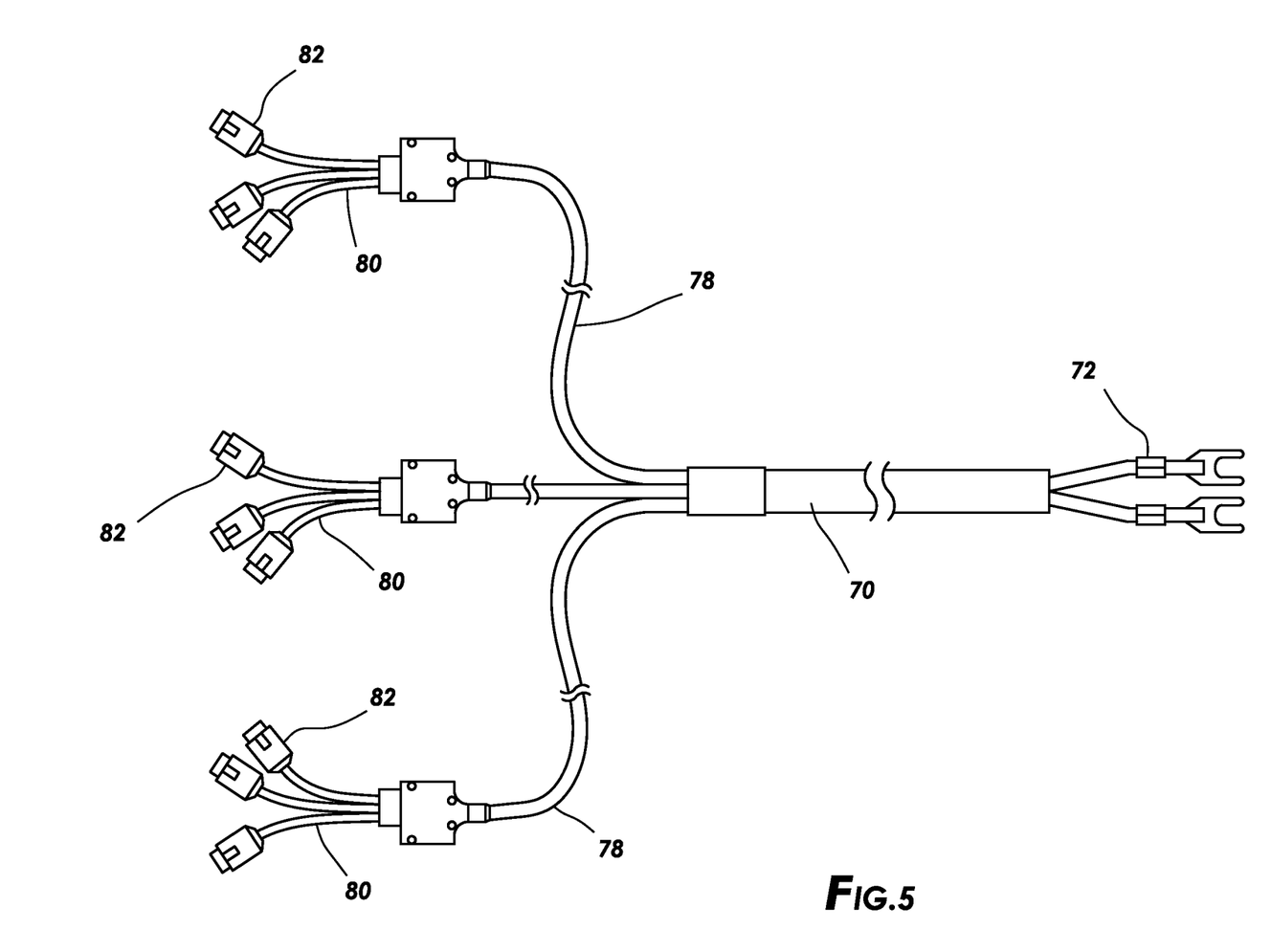
FIG. 5 is a schematic view of a cable management system according to aspects of the disclosure.

FIG. 5 is a schematic view of a cable management system according to aspects of the disclosure. A primary power cable or cable bundle 70 having an appropriate connector 72 for attachment to a power source 74 splits into multiple secondary cables 78 for providing power to the lighting strips. The secondary cables 78 can further split into tertiary cables 80 with connectors 82 for individual lighting strips. Other arrangements will be apparent to those skilled in the art.

The power supply can be a wall socket, batteries, generators, etc. In some instances, the heat generated by the power supplies is an issue as the heat may damage or negatively effect growth of the plants. Consequently, it may be desirable to position the power sources spaced from the plants and provide electric cable connections from the remote sources to the fixtures.

Figure 6:
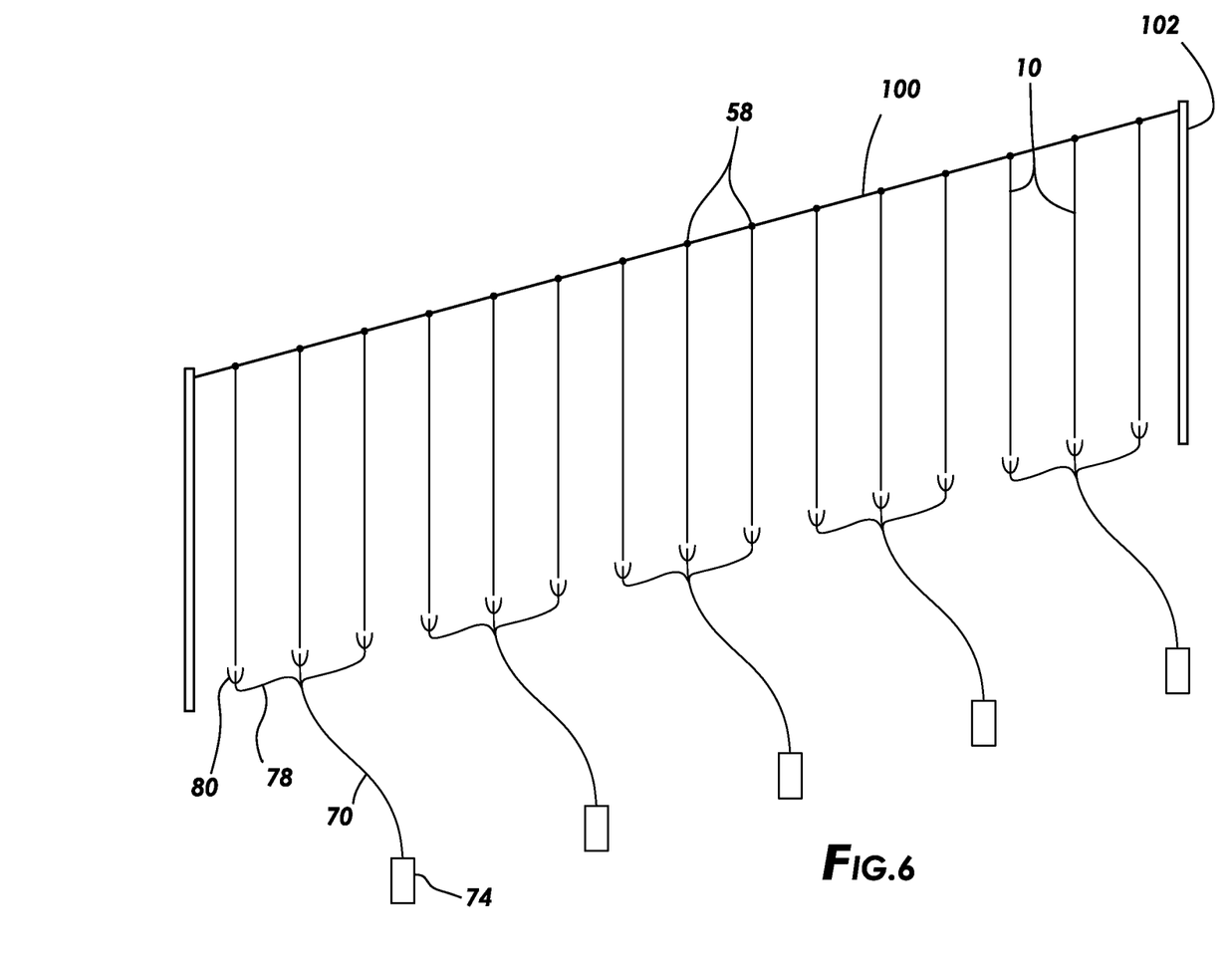
FIG. 6 is a schematic of an exemplary cable and power management system according to aspects of the disclosure.

FIG. 6 is a schematic of an exemplary cable and power management system according to aspects of the disclosure. A multitude of linear lighting sources 14, nine in this representation, are powered from one power cable 70 which has one connection to the power supply 74 which then reaches a variable distance in proximity of the linear lighting sources, splits into three secondary power cables 78, each of which splits again into three tertiary cables 80, thus creating nine supply cables, each having a mating connector for the linear light sources 14. The power is supplied to the lighting sources 14 and fixture 10 from below in the pictured embodiment. Lighting power from below may be preferable as it can be supplied from existing plug sockets in the walls, for example, without the requirement of installing additional electrical supply wiring from above, including wiring encased in conduits to meet building codes. Power supplied from below will also make it easier to move fixtures 10 as needed without having to access overhead wiring.

Figure 7:
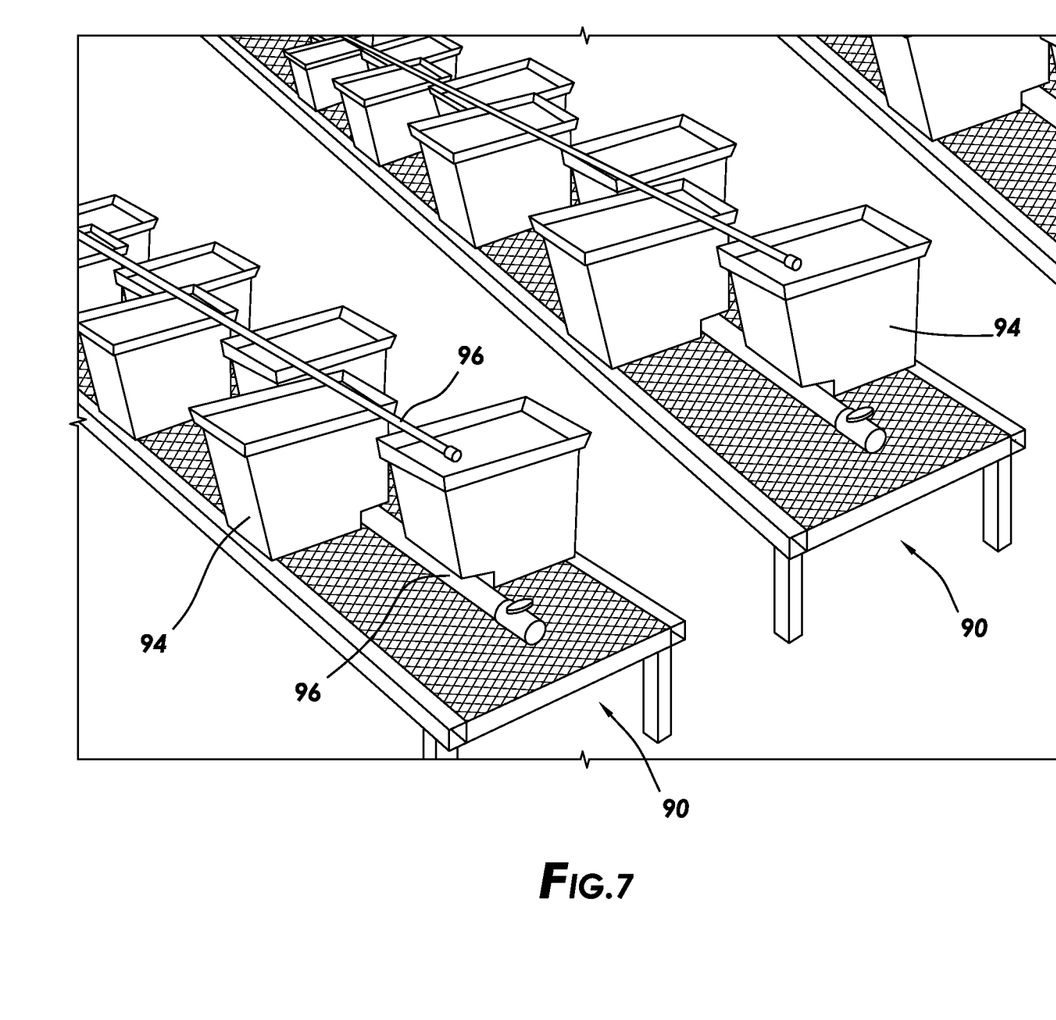
FIG. 7 is a schematic view of an exemplary grow facility in which the disclosed apparatus and methods can be used.

FIG. 7 is a schematic view of an exemplary grow facility in which the disclosed apparatus and methods can be used. A plurality of rows 90 of plants are arranged a selected distance apart. Often the plants are positioned raised above the floor on appropriate tables 92. A plurality of pots 94 are arranged in each row. The pots can be arranged linearly or staggered, as shown. The pots 94 are supplied with water and/or drainage from irrigation conduits 96, such as shown, for example.

Figure 8:
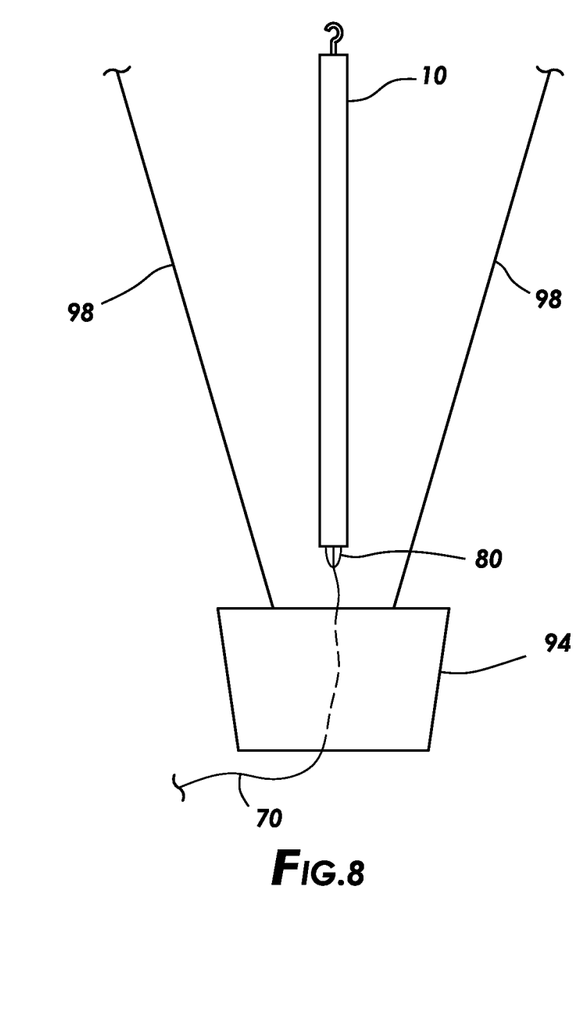
FIG. 8 is a schematic view of an exemplary planting arrangement for the plants according to aspects of the disclosure.

FIG. 8 is a schematic view of an exemplary planting arrangement for the plants according to aspects of the disclosure. It is common to plant multiple plants in a single pot. Further, for plants such as hops plants, vines and the like, growth supports 98 are positioned on which the plants may grow, climb, cling, etc. The growth supports are often string, wire, and the like and are often supported from above, such as by attachment to a guide wire or other anchoring support. In FIG. 8 for example, a single pot 94 is set up for two plants, each having a growth support 98. The growth supports 98 are angled away from one another to supply additional radial space for the plants to grow at higher levels as they grow taller. (The supports are generally vertical, which term includes deviation from the vertical to allow for radial spacing of the plants, such as seen in FIG. 8.) A lighting cable 70 provides power through split cables 78 to the lighting sources in the fixture 10 which is suspended from above the plants and positioned between the two plant supports 98 and plants (not shown). The cable 70 can simply run adjacent the pot and up to the fixture or can be run through the soil and pot to the fixture.

In some embodiments where multiple plants are grown from the same pot, each lighting source can correspond to a vine-like plant, the lighting sources positioned to orient light emitted from the lighting sources towards each of the corresponding plants. For example, each lighting channel can correspond to a vine-like plant, the lighting channels positioned to orient light emitted from the plurality of corresponding lighting sources towards each of the corresponding plants.

Returning to FIG. 6, a suspension or guide wire 100, or cable, pipe, etc., is suspended from a ceiling or on posts 102, as shown, and extends above the plants or rows of plants. The lighting fixtures 10 are suspended, such as by hooks or the like, from the suspension wire 100, and spaced apart and positioned as desired between or over pots and plants. The suspension wire is positioned in proximity to the plants in order for the lighting fixtures to hang vertically beside the support structures of the plants in some embodiments. A suspension wire may be preferred since it will not create significant shadows and allow for the maximum amount of natural light, where available, to reach the plants for maximum growth. A suspension wire also allows for the spacing between lighting fixtures to be easily adjusted in order to customize the light provided to the plants. Other arrangements are possible, such as supplying power for the lighting sources from above rather than from below. In such as arrangement the power cables, etc., are suspended or supported above the lighting fixtures and may require substantially more support due to the added weight of the cables. Supply from above also decreases the ease of access to the connections between cables and lighting strips and may make replacement of the lighting sources more difficult as well. The guide wire assembly also allows for the growth supports 98 to be attached to the guide wire. Further, such an arrangement allows for ease of movement of the lighting assemblies along the wire as they can simply be slid along the wire.

Figure 9:
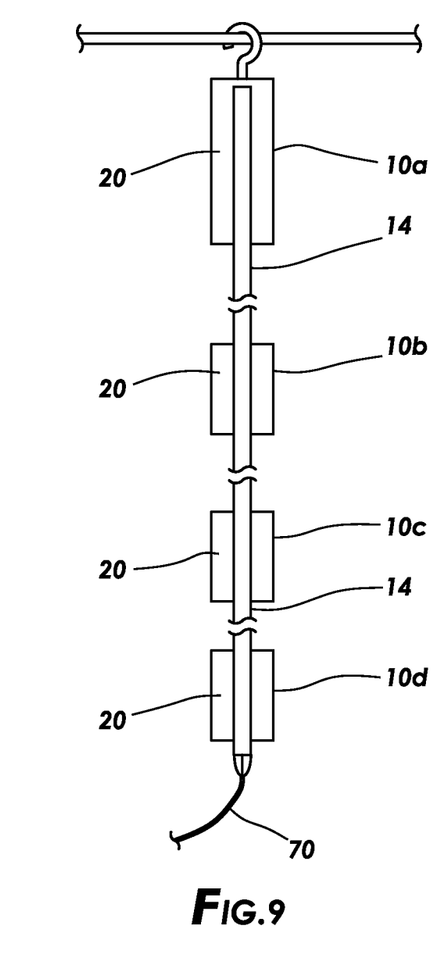
FIG. 9 is a schematic view of an alternate embodiment of the lighting fixture assembly according to aspects of the disclosure.

FIG. 9 is a schematic view of an alternate embodiment of the lighting fixture assembly according to aspects of the disclosure. In an alternate embodiment, instead of a single lengthy fixture 10, a plurality of shorter fixtures 10a-d are provided with the lighting source 14 attached at the lighting channels 12 of each short fixture. The lighting sources 14 extend between the fixtures 10a-d suspending the fixtures. In such an embodiment, an upper fixture 10a can be hung or attached to the guide wire or upper support. The lighting sources 14 are attached in the channels 12 of the fixture 10a and extend downward to the next lower fixture 10b, providing support for that fixture. The lighting sources extend further, attached to each fixture 10c-d, supporting them as well. This arrangement results in less suspended weight, less expensive fixtures, and less unwieldy fixtures which are easier and cheaper to transport. As explained above, the lighting sources 14 can be attached to the fixtures 10a-d with adhesive rather than or in addition to the use of lighting channels 12. It may be preferable to expose the adhesive backing only along the portions of the lighting sources contacting the fixtures 10a-d. The uppermost fixture 10a may be of greater length than the remaining fixtures 10b-d to allow for better gripping contact with the lighting sources. For example, when using adhesive backed lighting sources, the uppermost fixture 10a may be longer, allowing for greater contact surface area between the uppermost fixture 10a and the lighting sources as the uppermost fixture must act to grippingly suspend the full weight of the lighting sources. Alternately, the uppermost fixture 10a may employ an attachment mechanism, such as a clamp, clip, snap-in, or friction fit, to grippingly engage the lighting sources with sufficient strength to support the weight of the lighting sources and lower fixtures 10b-d.

The disclosed grow lighting system is for use with vine-like plants. In an embodiment, the system comprises an elongated fixture body having a longitudinal axis. The body defines a plurality of generally flat, elongated faces, each face facing away from the longitudinal axis of the body, that is facing outwardly. A plurality of linear grow light sources are removably attached to the elongated body and extend along the length of the body. The linear grow light sources are attached to the body along one of the elongated faces of the body. The fixture body can include lighting channels extending along the fixture faces for maintaining the grow lighting sources on the body or oriented as desired. The fixture body and attached grow lighting sources preferably provide a full 360 degree emission of grow light. The fixture body can be generally triangular or hexagonal, for example. An attachment mechanism is provided at one end of the body for suspending the fixture, for example from a strung support wire.

The grow lighting system at FIG. 9 includes a plurality of grow lighting fixtures 10a-d, arranged in a spaced-apart, generally vertical arrangement. Each grow lighting fixture comprises a plurality of generally flat exterior faces or walls 20 extending vertically along the fixture. A plurality of linear grow light sources 14, each light source having a plurality of spaced apart grow lights thereon, is attached, preferably removably, to each of the fixtures 10a-d at an exterior face 20. The exterior faces 20 of each fixture orient the linear light sources to emit light radially outward from the fixture. The linear light sources preferably emit light in a full 360 degree pattern. The fixtures 10a-d may also have light channels defined for maintain the linear light sources on the fixture and/or orienting the light sources. The linear lighting source can comprise an adhesive backing for maintaining the lighting source attached to the fixture. The system can further comprise a rod extending between and attached to adjacent fixtures, maintaining the fixtures in spaced apart relationship. The uppermost fixture 10a can comprise a means for attaching an uppermost fixture to a suspended wire. A power distribution assembly provides an electrical cable attachable to a power source, the cable splitting into a plurality of electrical wires, each wire removably attached to a linear lighting source. Each fixture 10a-d can be a tubular member, defining an inner longitudinally extending cavity.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed. For example, the fixtures are described as extruded plastic, although other manufacturing methods may be used to make the fixtures. Similarly, although heat dissipation is not required, and therefore the fixtures can be plastic or other non-radiative materials, it is possible to make the fixtures of metal or other material.

The words or terms used herein have their plain, ordinary meaning in the field of this disclosure, except to the extent explicitly and clearly defined in this disclosure or unless the specific context otherwise requires a different meaning. If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. The indefinite articles "a" or "an" mean one or more than one of the component, part, or step that the article introduces. The terms "and," "or," and "and/or" shall be read in the least restrictive sense possible. Each numerical value should be read once as modified by the term "about" (unless already expressly so modified), and then read again as not so modified, unless otherwise indicated in context.

It is claimed:

1. A generally vertical grow lighting system for use with plants, the system comprising:
    an elongated tubular body for positioning adjacent at least one plant, the tubular body defining a plurality of longitudinally extending lighting channels, each channel extending along the length of the body;
    a plurality of lighting strips having spaced apart lights for providing grow lighting for plants, each lighting strip removably positioned in one of the corresponding lighting channels, each lighting strip orienting its corresponding lights to emit light radially outward from the body; and
    a means for suspending the generally vertical tubular body above the floor; and
    a power supply assembly having a plurality of electrical wires corresponding to the plurality of lighting channels, each electrical wire removably attachable to a corresponding lighting strip, the plurality of wires spliced together into a single electrical cord attachable to a power source.

2. The grow lighting system of claim 1, wherein the means for suspending the tubular body comprises a hook, hanger, screw, clamp, or ring and wherein the tubular body is suspended from a generally horizontally extending wire.

3. The grow lighting system of claim 1, wherein the lighting strips are LED grow light strips.

4. The grow lighting system of claim 1, wherein the plurality of lighting channels further comprise three lighting channels which orient the emitted light from the corresponding lighting strips at approximately 120 degree intervals about the tubular body.

5. The grow lighting system of claim 1, wherein the plurality of lighting channels further comprise six lighting channels which orient the emitted light from the corresponding lighting strips at approximately 60 degree intervals about the tubular body.

6. The grow lighting system of claim 1, wherein the tubular body is generally triangular or hexagonal.

7. The grow lighting system of claim 1, wherein the lighting channels further comprise flanges for maintaining the lighting strips in the cannels.

8. The grow lighting system of claim 1, wherein the lighting strips are adhesively attached to the channels.

9. The grow lighting system of claim 1, wherein each lighting channel corresponds to a vine-like plant growing from a single plant pot, the lighting channels positioned to orient light emitted from the plurality of corresponding lighting strips towards each of the corresponding plants.

10. A grow lighting system for use with generally vertically trained plants, the grow lighting system comprising:
    a plurality of grow lighting fixtures, arranged in a spaced-apart arrangement, wherein each grow lighting fixture comprises a plurality of generally flat exterior faces extending longitudinally along the fixture;
    a plurality of linear grow light sources, each light source having a plurality of spaced apart lights thereon, each linear grow light source removably attached to each of the plurality of fixtures at an exterior face, the exterior faces of each fixture orienting the light sources to emit light radially outward from the fixture; and
    a power distribution assembly comprising an electrical cable attachable to a power source which splits into a plurality of electrical wires, each wire removably attached to one of the plurality of linear lighting sources.

11. The system of claim 10, further comprising on each face a lighting channel for maintaining a linear lighting source on the fixture.

12. The system of claim 10, wherein the linear lighting source further comprises an adhesive backing for maintaining the lighting source attached to the fixture.

13. The system of claim 10, further comprising a rod extending between and attached to adjacent fixtures.

14. The system of claim 10, further comprising a means for attaching an uppermost fixture to a suspended wire.

15. The system of claim 10, wherein the means for attaching the fixture to the wire or rail is a hook, clamp, clip, or ring.

16. The system of claim 10, wherein the exterior faces of each fixture comprise three faces oriented at approximately 120 degree intervals about the fixture.

17. The system of claim 10, wherein each fixture is a tubular defining an inner longitudinally extending cavity.

18. A grow lighting system for use with plants, the system comprising:

an elongated body having a longitudinal axis, the body having a plurality of generally flat elongated faces facing away from the longitudinal axis of the body;

a plurality of linear grow light sources removably attached to the elongated body and extending along the length of the body, each linear grow light source attached to one of the elongated faces of the body; and the elongated body suspended adjacent a plant growing along a growth support; and a power supply assembly having a plurality of electrical wires corresponding to the plurality of linear grow light sources, each electrical wire removably attachable to a corresponding grow light source, the plurality of wires spliced together into a single electrical cord attachable to a power source.

19. The grow lighting system of claim 18, the elongated body defining a plurality of longitudinally extending channels, each channel extending parallel to the longitudinal axis of the body, each of the plurality of grow light sources positioned in a corresponding channel.

20. The grow light system of claim 19, wherein each of the generally flat elongated faces forms a part of a corresponding longitudinally extending channel.

\* \* \* \* \*